(12) United States Patent
Arai et al.

(10) Patent No.: US 6,736,551 B2
(45) Date of Patent: May 18, 2004

(54) END FACE POLISHING APPARATUS

(75) Inventors: Kazuhiko Arai, Chiba (JP); Kouji Minami, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/187,574

(22) Filed: Jul. 2, 2002

(65) Prior Publication Data

US 2003/0045216 A1 Mar. 6, 2003

(30) Foreign Application Priority Data

Jul. 5, 2001 (JP) ........................................ 2001-204756

(51) Int. Cl.[7] ................................................ G02B 6/36
(52) U.S. Cl. ......................... 385/85; 385/134; 385/147; 451/41; 451/51; 451/66; 83/237
(58) Field of Search ................. 385/85, 134, 147; 451/41, 51, 66; 83/237

(56) References Cited

U.S. PATENT DOCUMENTS

| | | | | |
|---|---|---|---|---|
| 5,107,627 A | * | 4/1992 | Mock et al. ................ | 451/271 |
| 5,497,443 A | * | 3/1996 | Jie et al. ..................... | 385/134 |
| 5,665,656 A | * | 9/1997 | Jairath ........................ | 438/692 |
| 5,868,605 A | * | 2/1999 | Cesna ......................... | 451/41 |
| 6,039,630 A | * | 3/2000 | Chandler et al. ............. | 451/6 |
| 6,165,055 A | * | 12/2000 | Takahashi et al. .......... | 451/278 |
| 6,402,595 B1 | * | 6/2002 | Fiesser ....................... | 451/41 |
| 6,428,399 B1 | * | 8/2002 | Tanabe et al. ............... | 451/66 |
| 6,458,012 B1 | * | 10/2002 | Hirokawa et al. ........... | 451/5 |
| 2001/0023164 A1 | * | 9/2001 | Minami et al. .............. | 451/41 |
| 2002/0131723 A1 | * | 9/2002 | Kolasinski et al. .......... | 385/85 |
| 2002/0159718 A1 | * | 10/2002 | Boyer et al. ................. | 385/85 |
| 2003/0036342 A1 | * | 2/2003 | Yamada et al. .............. | 451/66 |

FOREIGN PATENT DOCUMENTS

| | | | | |
|---|---|---|---|---|
| EP | 535636 A2 | * | 4/1993 | ............ G02B/6/25 |
| JP | 02139171 A | * | 5/1990 | ........... B24B/37/00 |

* cited by examiner

Primary Examiner—Akm Enayet Ullah
Assistant Examiner—Daniel Petkovsek
(74) Attorney, Agent, or Firm—Adams & Wilks

(57) ABSTRACT

An end face polishing apparatus has a support member mounted for undergoing rotational movement. A tubular member is mounted on the support member for rotation therewith. The tubular member has a first surface connected to a main surface of the support member and a second surface extending in an axial direction at a first distance from the main surface of the support member. A lapping member is mounted on the support member for rotation therewith. The lapping member has a first surface connected to the main surface of the support member and a second surface extending in the axial direction at a second distance from the main surface of the support member smaller than the first distance.

21 Claims, 6 Drawing Sheets

END FACE POLISHING APPARATUS

BACKGROUND OF THE INVENTION

1. Field of the Invention

The present invention relates to an end face polishing apparatus for polishing an end face of a rod-shaped member such as a fiber for optical communication.

2. Description of the Background Art

Fibers for optical communication are adhesively secured in the central hole of a ferrule, a main member of a connector, and then the ferrule end face and the end face of fibers are polished together and thus finished into a smooth, mirror surface. If the polished end faces of the ferrule and the fibers are not vertical to the central axis of the ferrule or if there is a flaw on the polished faces, the precision in positioning such ferrules as they are connected facing each other in an optical connector is lowered, and the loss increases. Therefore, the face of the ferrule including the optical fibers must be polished with high precision.

A conventional apparatus for polishing the end faces of optical fibers is disclosed for example by Japanese Patent Laid-Open No. 26456/1991. The disclosed end face polishing apparatus includes an eccentric adapter that rotates on a circle concentric with a rotating disc, and a planetary gear that transmits the rotation of a revolving motor to the eccentric adapter. These elements are coupled in a lapping machine, so that the lapping machine is allowed to rotate and revolve, while the end faces of a plurality of ferrules held by a polishing fixture are pressed against a lapping member secured to the lapping machine for lapping.

As described above, in the conventional optical fiber end face polishing apparatus, the plurality of ferrules held by the polishing fixture are pressed by a spring or the like against the lapping member secured to the lapping machine that rotates and revolves. However, the ferrules are polished based on time, and the polishing length for the ferrules cannot be controlled. When the ferrules mounted on the polishing fixture have the same length, there would be no problems. However their lengths are not equal because of the precision of ferrules or adhesive used to secure optical fibers coming out from the tip ends of ferrules and cured. When therefore such ferrules having different lengths are slid into contact with the lapping machine, the polishing fixture could be inclined relative to the lapping machine, and the lapping angle, the radius of curvature and the eccentricity could be deviated. The ferrules after the polishing could have different lengths.

SUMMARY OF THE INVENTION

The present invention overcomes the disadvantages of the conventional art and it is an object of the invention to provide an end face polishing apparatus with improved polishing precision regardless of the length of ferrules when end faces of the ferrules are polished.

According to a first aspect of the present invention directed to a solution to the above disadvantages, an end face polishing apparatus polishing a rod-shaped member mounted at a polishing fixture by pressing the rod-shaped member against a lapping member on a lapping machine provided on a surface plate which is supported at the main body of the apparatus to rotate and rock includes a plurality of rod-shaped guide members provided at the polishing fixture and radially outwardly projecting, and a tubular member capable of supporting the polishing fixture through the guide members on the surface plate. The guide members at the polishing fixture and the tubular member abut against each other, so that the movement of the polishing fixture in the pressing direction is restricted.

According to a second aspect of the invention, in the end face polishing apparatus according to the first aspect, the polishing fixture is provided with at least three such guide members.

According to a third aspect of the invention, in the end face polishing apparatus according to the second aspect, the polishing fixture is provided with six such guide members.

According to a fourth aspect of the invention, in the end face polishing apparatus according to any one of the first to third aspects, the tubular member is placed on the surface plate as its movement in the radial and circumferential directions is restricted.

According to a fifth aspect of the invention, in the end face polishing apparatus according to the fourth aspect, the tubular member and the surface plate are closely contacted by magnetic force.

According to a sixth aspect of the invention, in the end face polishing apparatus according to any one of the first to fifth aspects, the rod-shaped member is a ferrule including a ferrule tubular body for holding optical fibers and a collar member provided at a rear end of the ferrule tubular body for holding coated optical fibers.

According to a seventh aspect of the invention, in the end face polishing apparatus according to any one of the first to six aspects, the position to provide the lapping machine at the surface plate and the position to provide the tubular member are level and controlled in height by grinding, and the heights of the lapping machine and the tubular member are controlled by grinding.

According to an eighth aspect of the invention, an end face polishing apparatus polishes a rod-shaped member mounted at a polishing fixture by pressing the rod-shaped member against a lapping member on a lapping machine provided on a surface plate that is supported at the main body of the apparatus to rotate and rock, the polishing fixture has a plurality of rod-shaped guide members radially outwardly projecting, and the apparatus includes a tubular member supporting the polishing fixture through the guide members on the surface plate.

According to a ninth aspect of the invention, the surface of the guide member in abutment against the tubular member in the end face polishing apparatus according to the eighth aspect is a plane.

According to a tenth aspect of the invention, the surface of the tubular member in abutment against the guide member in the end face polishing apparatus according to the eighth aspect is a plane.

According to an eleventh aspect of the invention, the plane in the end face polishing apparatus according to the eighth aspect is horizontal.

According to a twelfth aspect of the invention, an end face polishing apparatus includes a tubular member at the outer periphery of a surface of a surface plate, and a lapping machine provided on the surface of the surface plate, and the lapping machine is parted from the tubular member in the axial direction and has a height lower than that of the tubular member.

According to a thirteenth aspect of the invention, an end face polishing apparatus includes a tubular member at the outer periphery of a surface of a surface plate, a lapping machine that is provided on the surface of the surface plate, parted from the tubular member in the axial direction and has a height lower than that of the tubular member, and a polishing fixture having a guide member held slidably at a surface on the side of the tubular member opposite to the side facing the surface plate.

According to a fourteenth aspect of the invention, an end face polishing apparatus includes a tubular member at the outer periphery of a surface of a surface plate, a lapping machine that is provided on the surface of the surface plate, parted from the tubular member in the axial direction and has a height lower than that of the tubular member, and a polishing fixture having a guide member thereon. The guide member is held slidably at a surface on the side of the tubular member opposite to the side facing the surface plate.

According to a fifteenth aspect of the invention, an end face polishing apparatus includes a tubular member at the outer periphery of a surface of a surface plate, and a lapping machine parted from the tubular member in the axial direction and having a height lower than that of the tubular member on the surface of the surface plate, and the polishing height is controlled based on the difference between the heights of the tubular member and the lapping machine.

According to a sixteenth aspect of the invention, an end face polishing jig includes a plurality of guide members radially outwardly projecting.

According to a seventeenth aspect of the invention, a polishing fixture holds a ferrule at an inclined surface on a outer peripheral side thereof, the ferrule includes a ferrule tubular body for holding optical fibers and a collar member provided at the rear end of the ferrule tubular body for holding coated optical fibers, the polishing fixture holds the ferrule so that the front end of the ferrule tubular body is positioned at the lower side and the lower part of the circle of the collar member in contact with the outer periphery of the ferrule is positioned at the upper surface.

According to an eighteenth aspect of the invention, an end face polishing jig includes a guide member radially outwardly projecting at the upper surface of the polishing fixture in the seventeenth aspect, and having a lower surface in a position on an extension of the upper surface of the polishing fixture.

According to the invention, a polishing fixture is provided with a guide member and a tubular member capable of supporting the polishing fixture through the guide member on a surface plate, so that the polishing fixture can be kept parallel to the surface plate, and the polishing precision for bar-shaped members can be improved. In addition, the lengths of the bar-shaped members after polishing can be equalized.

DETAILED DESCRIPTION OF THE PREFERRED EMBODIMENTS

Embodiments of the present invention will now be described in conjunction with the accompanying drawings.

Figure 1:
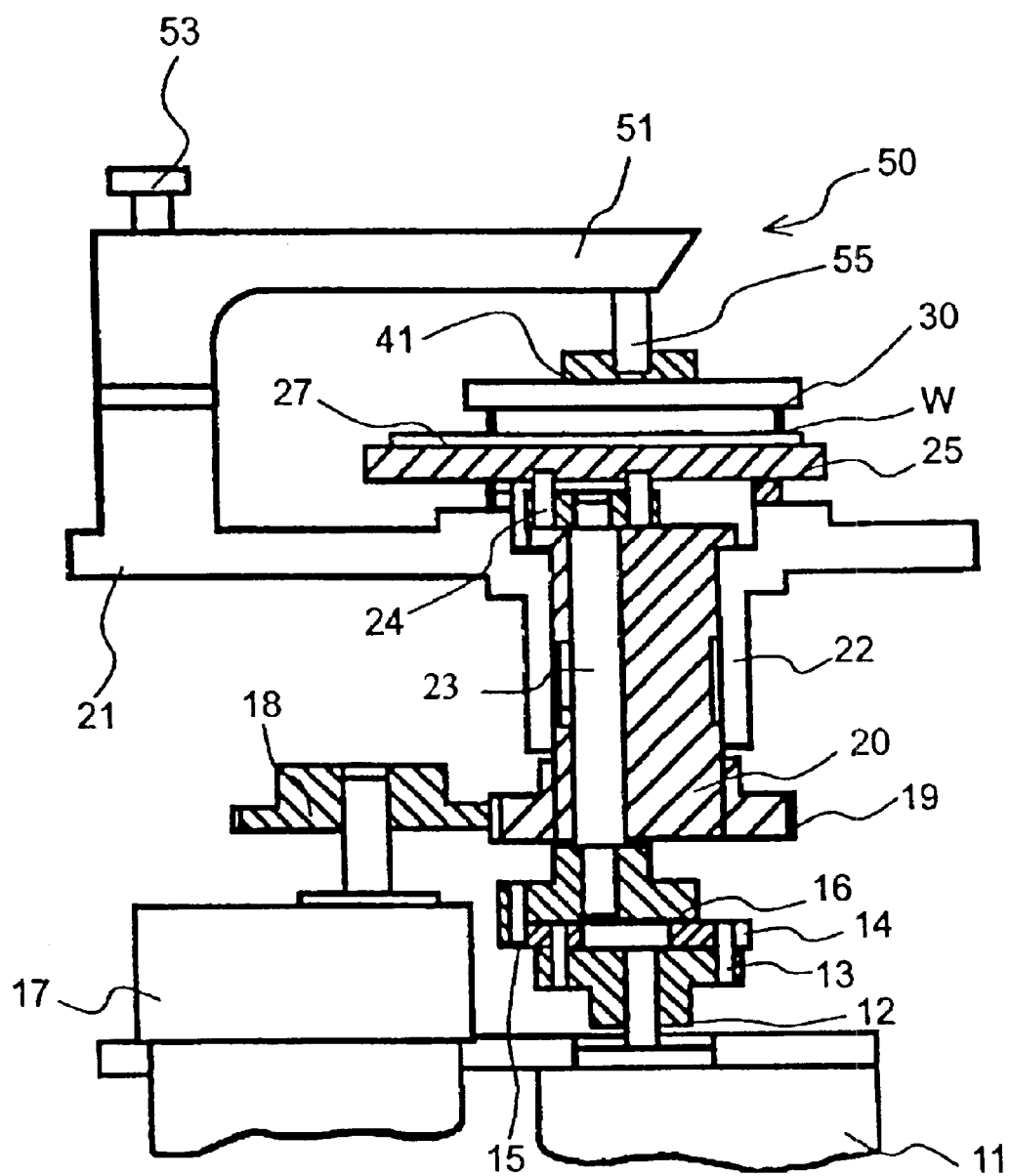
FIG. 1 is a schematic sectional view of an end face polishing apparatus according to one embodiment of the present invention.
Figure 2:
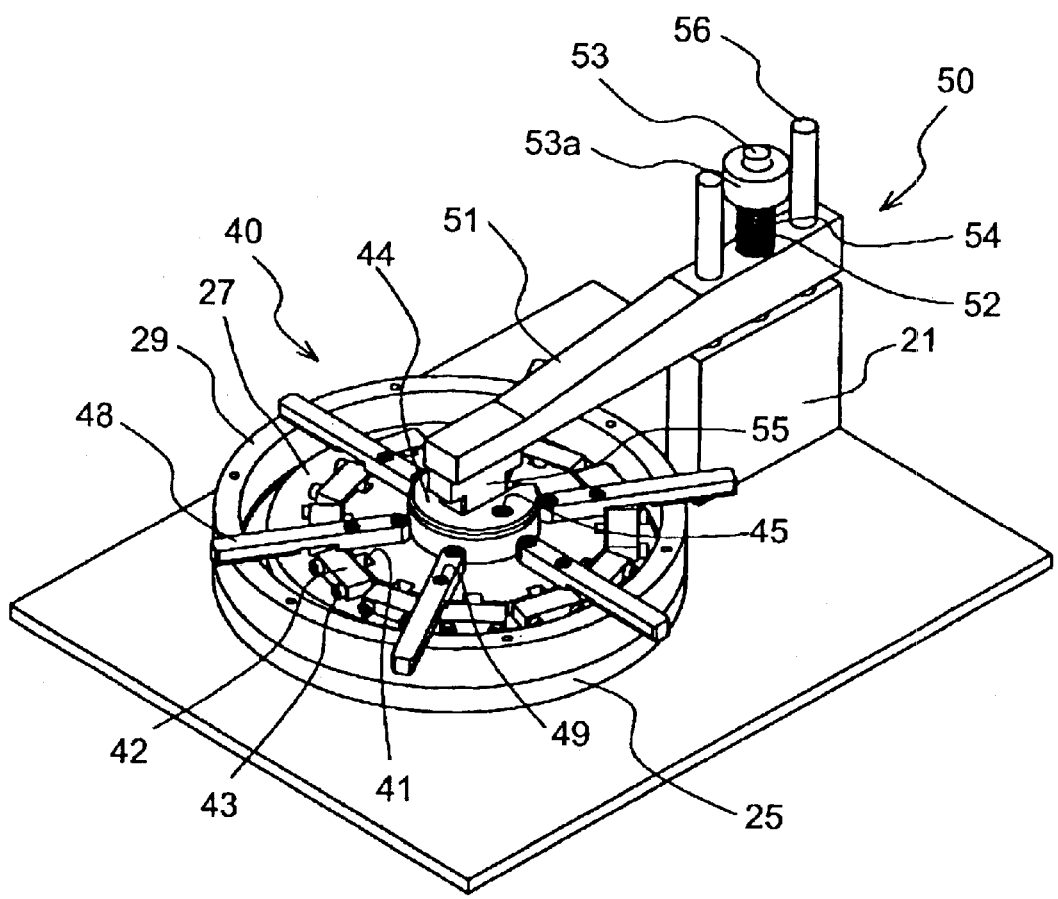
FIG. 2 is a perspective view of a surface plate, a lapping machine and a polishing fixture according to the embodiment.
Figure 3:
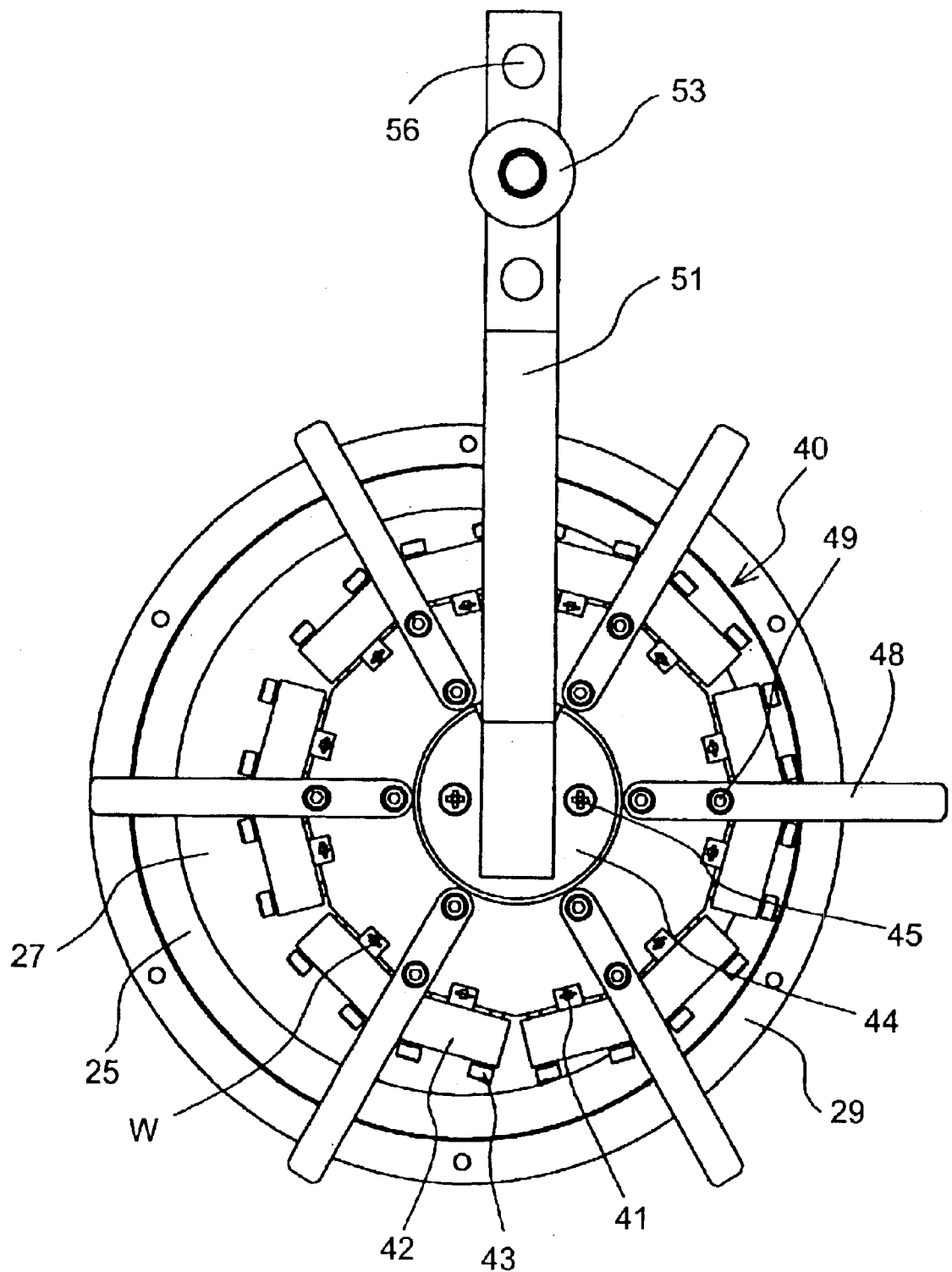
FIG. 3 is a plan view of the surface plate, the lapping machine and the polishing fixture according to the embodiment.
Figure 4:
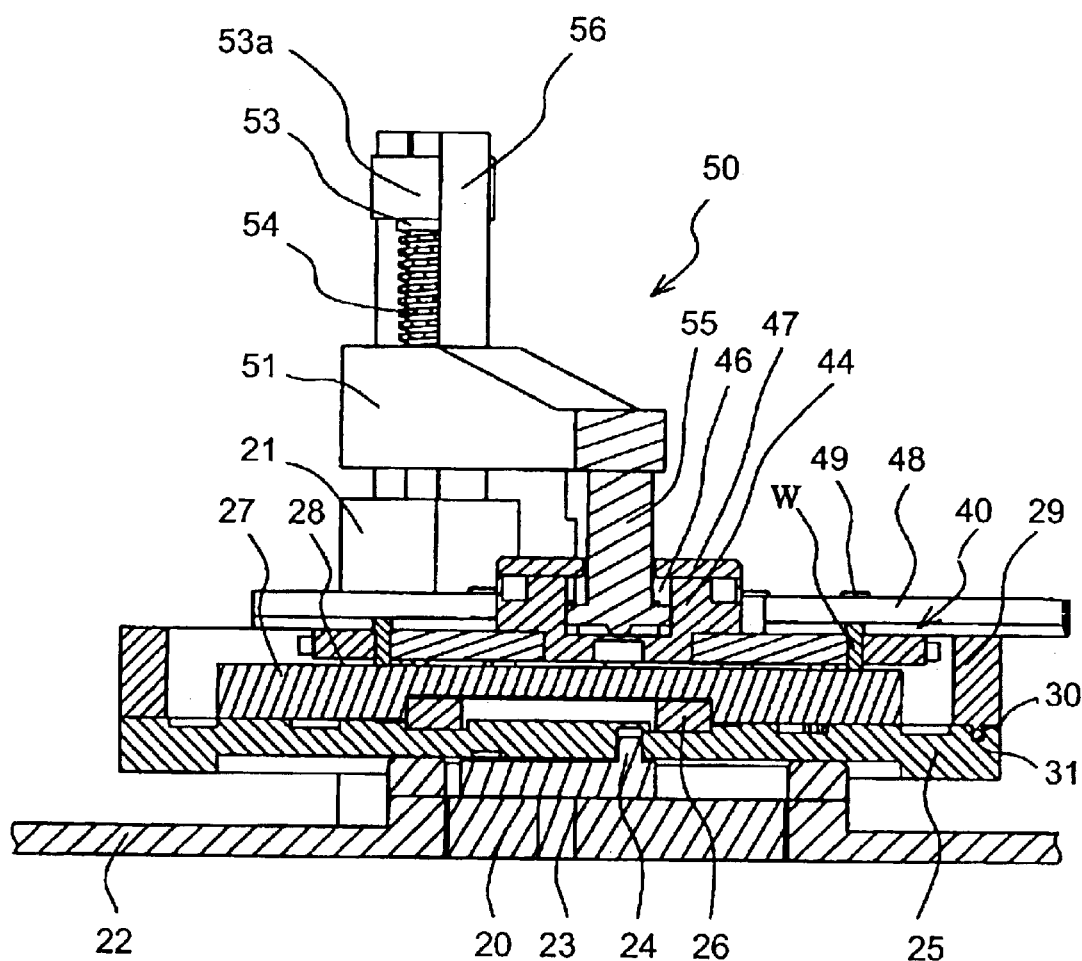
FIG. 4 is a sectional view of the surface plate, the lapping machine and the polishing fixture according to the embodiment.

FIG. 1 is a schematic sectional view of an end face polishing apparatus according to one embodiment of the invention. FIG. 2 is a perspective view of a surface plate, a polishing fixture, and a lapping machine. FIG. 3 is a plan view of the surface plate and the polishing fixture. FIG. 4 is a sectional view of the surface plate, the lapping machine, and the polishing fixture.

As shown in FIG. 1, the central part of a first rotation transmission plate 12 is rigidly coupled to the rotation shaft of a rotating motor 11. A plurality of first coupling pins 13 are secured to the first rotation transmission plate 12 concentrically around the rotation center of the first rotation transmission plate 12. The first coupling pins 13 are each rotatably coupled to an eccentric part of a corresponding one of rotation transmission plates 14. Second coupling pins 15 are each secured at an eccentric part of a corresponding one of the rotation transmission plates 14. The second coupling pins 15 are rotatably coupled to a second rotation transmission plate 16.

Meanwhile, the central part of a driving gear 18 is rigidly coupled to the rotation shaft of a revolving motor 17 and the driving gear 18 is engaged with a driven gear 19. The driven gear 19 is rigidly coupled to the lower periphery of a revolution transmission shaft 20, the upper periphery of which is engaged with the bearing tube 22 of an apparatus main body 21. A rotation shaft 23 is rotatably fitted in a position a prescribed distance deviated from the center of the revolution transmission shaft 20, and the lower end of the rotation shaft 23 is rigidly coupled to the rotation center of the second rotation transmission plate 16.

The rotation shaft 23 has its upper end coupled to a support member in the form of a surface plate 25 through a coupling member 24. At the upper surface of the surface plate 25, a lapping machine 27 is provided. The lapping machine 27 is provided with a lapping member 28 such as a lapping sheet including a medium such as electro-forming diamond through a detachably fitted surface boss 26.

On the surface plate 25, there is a tubular member 29 whose one end face is abutted against the surface of the surface plate 25 as the movement of the tubular member in the radial and circumferential directions is restricted.

Figure 5A:
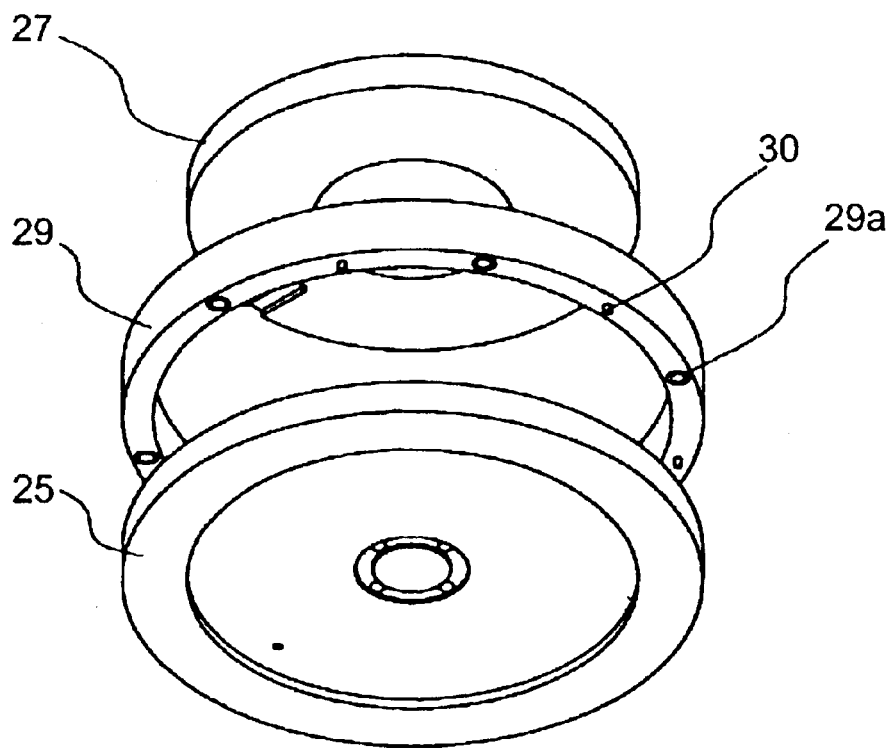
FIG. 5A is a perspective view of the surface plate, the lapping machine and a tubular member according to the embodiment.
Figure 5B:
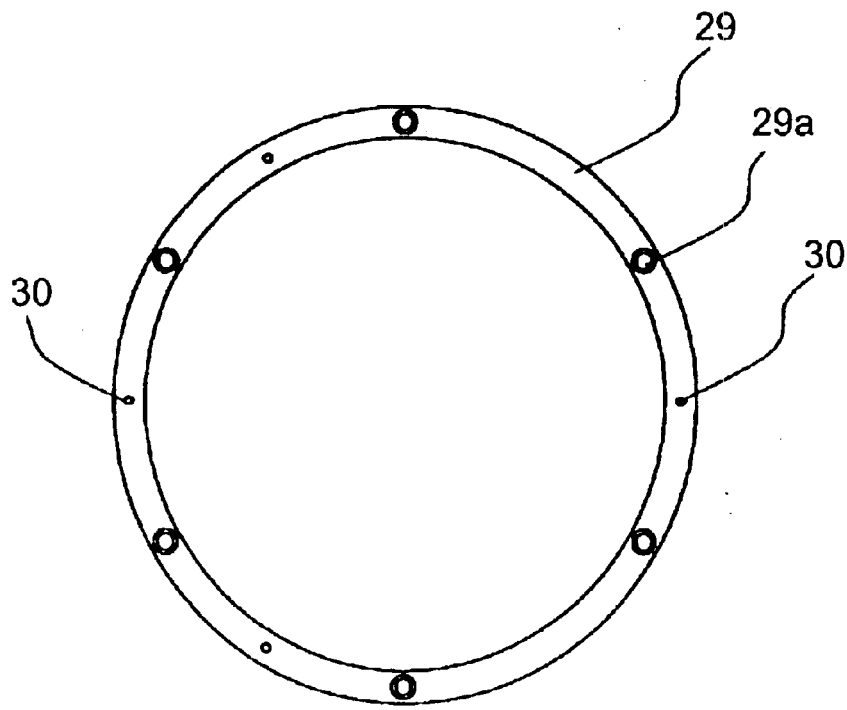
FIG. 5B is a plan view of the tubular member.

More specifically, as shown in FIGS. 5A and 5B, the tubular member 29 is in a tubular shape whose inner diameter is larger than an outer diameter of a polishing fixture 40 which excludes a guide member 48 that will be described below. The end face of the tubular member abutted against the surface of the surface plate 25 is provided with at least three raised portions 30 at equal intervals projecting toward the surface plate 25. The raised portions 30 fit with recessed portions 31 provided at the surface plate 25 corresponding to the raised portions 30, so that the movement of the tubular member in the radial and circumferential directions is restricted. Note that FIG. 5A is a perspective view of the surface plate 25, the tubular member 29 and the lapping machine 27, and FIG. 5B is a plan view of the tubular member 29.

The tubular member 29 as described above is formed to have a prescribed height from the surface plate 25, so that the member must be positioned in the circumferential direction on the surface plate 25. Therefore, according to the embodiment, an additional raised portion 30 is provided between the three raised portions 30 to restrict the radial and circumferential movement, so that the tubular member 29 is sure to be attached in the same direction. This allows the height of the tubular member 29 to be highly precise accordingly.

The number and shape of the raised portions 30 and the recessed portions 31 provided at the tubular member 29 and the surface plate 25 are not particularly limited. The intervals among the three raised portions 30 may be unequal and the attaching direction may always be the same, or four or more raised portions 30 may be provided.

The tubular member 29 is placed as it is in close contact onto the surface plate 25. The close contacted state is provided by magnetic force. More specifically, as shown in FIGS. 5A and 5B, a plurality of permanent magnets 29a are embedded in the surface of the tubular member 29 in abutment against the surface plate 25.

As shown in FIG. 4, the position to place the lapping machine 27 at the surface plate 25 and the position to place the tubular member 29 are level with each other. The height control is highly precisely performed by grinding and the heights of the tubular member 29 and the lapping machine 27 are also highly precisely controlled by grinding.

More specifically, the end face of the tubular member 29 on the side of the polishing fixture 40 and the polishing surface of the lapping machine 27 have their heights controlled, so that no error is caused because of height difference among positions.

The tubular member 29 slides in contact with a guide members 48 provided at the polishing fixture 40 which will be described, and therefore is preferably made of an oil less metal for example which has low frictional resistance when it slides in contact.

The tubular member 29 is ground as it is placed on the surface plate 25 so that the attaching direction is always the same, and therefore its height from the surface plate 25 can be set highly precisely. Preferably, in a similar manner, a plurality of such tubular members 29 having different heights are prepared. Thus, the height to be achieved by polishing can readily be changed with high precision.

Meanwhile, the polishing fixture 40 having a plurality of rod-shaped members W secured is supported by the apparatus main body 21 by a supporting mechanism 50.

The supporting mechanism 50 and the polishing fixture 40 will now be detailed.

As shown in FIGS. 2 to 4, the polishing fixture 40 has a polygonal shape, and has a fitting 42 facing a recessed portion 41 formed at each side surface. The rod-shaped member W is held between the recessed portion 41 and the fitting 42 and the fitting 42 is secured with fitting securing screws 43, so that the rod-shaped member W is detachably secured to the polishing fixture 40.

According to the embodiment, the polishing fixture 40 has a dodecagon shape, to each side of which a rod-shaped member W can be secured, in other words, twelve rod-shaped members W altogether can be secured. The type of the rod-shaped member W is not limited and may be a rod-shaped member such as a ferrule, a rod-shaped member having a rectangular section such as a multi-fiber ferrule and a multi-fiber optical connector. The fitting 42 and the fitting securing screw 43 used to secure the rod-shaped member W to the polishing fixture 40 are not particularly limited.

In the center of the upper surface of the polishing fixture 40, a polishing fixture boss 44 is secured by boss securing screws 45. There is a rectangular slit 46 penetrating through the center of the polishing fixture boss 44 in the thickness-wise direction and opened at a side. There is also a plate shaped, chamfered plastic cover 47 on the polishing fixture boss 44.

At the upper surface of the polishing fixture 40, there are the rod-shaped guide members 48 that project radially outwardly from the polishing fixture 40. At the upper surface of the polishing fixture 40, there are the rod-shaped guide members 48 that project radially outwardly from the polishing fixture 40.

The guide members 48 are each secured to the upper surface of the polishing fixture 40 by two guide member securing screws 49 and slide in contact with the end face of the tubular member 29 that rotates as the surface plate 25 rotates, so that the movement of the polishing fixture 40 in the pressing direction is restricted to keep parallel the polishing fixture 40.

Therefore, at least three guide members 48 are necessary for the polishing fixture 40. Meanwhile, if the number of the guide members 48 is three, the rod-shaped members W could be ground more than necessary because part of the polishing fixture 40 might have a height lower than the tubular member 29 between two slidably contacting guide members 48 when the polishing fixture 40 slides in contact with the tubular member 29 in an oblique direction. Therefore, the number of guide members 48 is preferably at least six. If there are many guide members 48, the weight of the polishing fixture 40 increases, which could lower the polishing precision, so that six guide members 48 are preferably provided. There is a recess in the lower part in the center of the length of the guide member 48 over the fitting 42 so that the rod-shaped member W can readily be mounted.

Figure 6A:
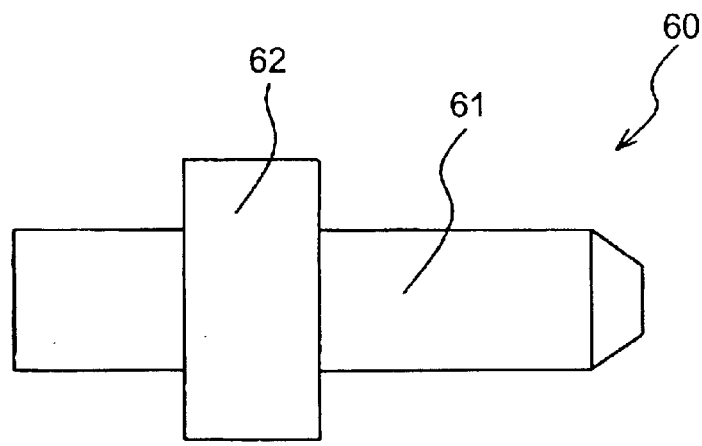
FIGS. 6A and 6B are plan views each showing a rod-shaped member according to the embodiment.
Figure 6B:
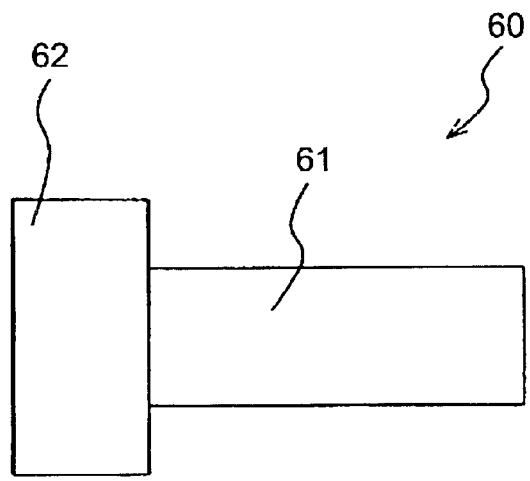

According to the embodiment, as shown in FIG. 6A, the rod-shaped member W secured to the polishing fixture 40 is a ferrule 60 including a ferrule tubular body 61 made of zirconia for holding optical fibers inserted therein and a collar portion 62 made of a metal fit into the rear end of the tubular body for holding inserted coated optical fibers. Alternatively, as shown in FIG. 6B, the rod-shaped member W may be a ferrule 60 including the ferrule tubular body 61 and the collar portion 62 formed in an integral form. Note that FIGS. 6A and 6B are plan views each showing an example of the rod-shaped member.

According to the embodiment, the tip end face of the collar portion 62 of the ferrule 60 as the rod-shaped member W is secured in abutment against the polishing fixture 40. Therefore, the guide members 48 slidably contact the tubular member 29 in the level as high as that of the tip face of the collar portion 62 of the ferrule 60, so that the length of the ferrule tubular body 61 can readily be controlled.

Figure 7:
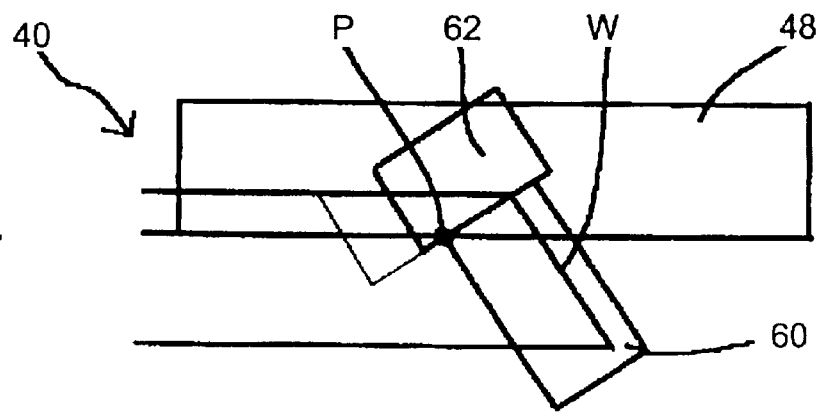
FIG. 7 is a sectional view showing how the rod-shaped member is secured according to the embodiment.

FIG. 7 is a sectional view showing how the ferrule 60 having the collar portion 62 is attached to the polishing fixture 40. The polishing fixture 40 has a side face inclined outwardly downwardly in the outer peripheral direction. A contacting point P between the collar portion 62 of the rod-shaped member W and the outer periphery of the ferrule 60 is located at the upper surface of the polishing fixture 40, so that the attaching position in the height-wise direction of the rod-shaped member W can therefore be always constant. There are guide members 48 projecting radially outwardly at the upper part of the polishing fixture 40. The bottom of the guide members 48 is level with the point P. Here, the rod-shaped member W is secured with the fitting 42 as if the attachment manner example shown in FIG. 4 is inclined. Thus, the difference between the heights of the tubular member 29 and the lapping machine 27 in FIG. 4 allows the polishing height for the rod-shaped member W to be constant.

Meanwhile, the supporting mechanism 50 is held such that the supporting portion 51 provided approximately parallel to the lapping machine 27 at the main body 21 is urged downward by prescribed pressing force.

More specifically, at the base end of the supporting portion 51, there is a through hole 52 penetrating in the thickness-wise direction, and an adjusting screw 53 threadably engages with the apparatus main body 21 through the through hole 52. The adjusting screw 53 is placed through an urging spring 54 that abuts against the flange portion 53a of the adjusting screw 53 and the supporting portion 51 to urge the supporting portion 51 downward by prescribed pressing force.

The pressing force by the urging spring 54 can be adjusted based on the position of the flange portion 53a of the adjusting screw 53, in other words, based on how much the adjusting screw 53 is engaged.

Note that the supporting portion 51 has its base end portion penetrated through a slide pin 56 provided at the apparatus main body 21, so that the movement of the adjusting screw 53 in the rotation direction can be restricted.

At the tip end of the supporting portion 51, there is a pressing portion 55 having a square pole shape that projects toward the polishing fixture 40 and fits into the slit 46 of the polishing fixture boss 44. The pressing portion 55 is engaged with the slit 46 of the polishing fixture boss 44, so that the polishing fixture 40 is pressed downward to the supporting portion 51 by prescribed pressing force and has its movement restricted in the rotation direction.

More specifically, the polishing fixture 40 is urged toward the lapping machine 27 by the supporting portion 51 as it has its movement restricted in the rotation direction by the pressing portion 55 of the supporting portion 51, and supported on the lapping machine 27 through the tip end of the rod-shaped members W secured by the fittings 42. Once the rod-shaped members W are polished for a prescribed amount, the guide members 48 slide in contact with the tubular member 29 on the surface plate 25, and support the polishing fixture 40 parallel to the lapping machine 27, so that the amount of polishing the rod-shaped members W is restricted.

Thus, the polishing fixture 40 is provided with the guide members 48 and the tubular member 29 capable of supporting the polishing fixture 40 through the guide members 48 is provided on the surface plate 25, so that the lengths of the rod-shaped members W can be equal, and deviations and variations in the radius of curvature, the polishing angle, and the eccentricity can be reduced. As in the embodiment, when the rod-shaped member W is a ferrule, the removal of adhesive coming out from the tip end of the ferrule is not necessary for equalizing the lengths of the rod-shaped members W, and therefore the polishing step can be simplified.

In addition, the heights of the surfaces of the tubular member 29 and the lapping machine 27 provided at the surface plate 25 are controlled, so that the length of the rod-shaped member W can readily be specified and errors in the length can be prevented.

The tubular members 29 having different heights are prepared and switchably used, so that the length of the rod-shaped member W after polishing can readily be controlled.

The operation of the above end face polishing apparatus according to the embodiment will now be described.

As shown in FIG. 1, the revolution motor 17 is driven to rotate the revolution transmission shaft 20 through the gears 18 and 19, and the lapping machine 27 revolves by a prescribed amount of eccentricity. In this case, the rotation shaft 23 is located in the revolution transmission shaft 20, while a plurality of rotation transmission plates 14 are provided in the space between the rotation shaft 23 and the first rotation transmission plate 12, the rotation transmission plates 14 rotate around the first coupling pins 13 in the same rotation phase as the revolution transmission shaft 20. Therefore, regardless of whether the first rotation transmission plate 12 is stationary or rotates, the rotation of the revolution transmission shaft 20 is not restricted.

Meanwhile, the rotation motor 11 is driven to rotate the first rotation transmission plate 12, while the first coupling pins 13 are located concentrically with the first rotation transmission plate 12, and therefore move in the same trajectory as the above. The rotation shaft 23 is deviated by a prescribed distance from the center, while the shaft is coupled through the rotation transmission plates 14, and therefore the rotation at the same number of revolutions as that of the first rotation transmission plate 12 is transmitted to the rotation shaft 23.

Thus, the surface plate 25 revolves as it rotates by the rotation of the revolution transmission shaft 20 and the rotation shaft 23, so that the lapping machine 27 and the tubular member 29 on the surface plate 25 are rotated.

Meanwhile, with respect to the lapping member 28 at the lapping machine 27, the polishing fixture 40 has its movement in the rotation direction restricted by the pressing portion 55 of the supporting portion 51, and is urged toward the lapping machine 27. In this way, the end faces of rod-shaped members W are pressed against the lapping member 28.

At the time, the difference between the lengths of the rod-shaped members W causes the polishing fixture 40 to be not parallel to the lapping machine 27, and the end faces of the rod-shaped members W are polished into an inclined surface. However, as the polishing proceeds, the guide members 48 provided at the polishing fixture 40 slide in contact with the tubular member 29 provided on the surface plate 25, so that the polishing fixture 40 is supported parallel to the lapping machine 27. Therefore, the tip ends of the rod-shaped members W can be polished with reference to the lapping machine 27. Thus, the lengths of the rod-shaped members W can be equalized, and deviations and variations in the radius of curvature, the polishing angle, and the eccentricity can be reduced. Consequently, the tip ends of the rod-shaped members W can be processed into an ideal convex sphere.

As in the foregoing detailed description of the embodiment, by the end face polishing apparatus according to the present invention, a plurality of rod-shaped guide members are provided at the polishing fixture and the polishing fixture is provided with a tubular member capable of supporting the polishing fixture through the guide members on the surface plate. In this way, the polishing can be performed with reference to the lapping machine, and the lengths of the rod-shaped members can be equalized, and deviations and variations in the radius of curvature, the polishing angle and the eccentricity can be reduced. The removal of adhesive attached to the rod-shaped members is not necessary for equalizing their lengths, and therefore the polishing step can be simplified.

What is claimed is:

1. An end face polishing apparatus comprising:
   a support member having a main surface and mounted for undergoing rotational movement;
   a tubular member mounted on the support member for rotation therewith, the tubular member having a first surface connected to the main surface of the support member and a second surface extending in an axial direction at a first distance from the main surface of the support member; and
   a lapping member mounted on the support member for rotation therewith, the lapping member having a first surface connected to the main surface of the support member and a second surface extending in the axial direction at a second distance from the main surface of the support member smaller than the first distance.

2. An end face polishing apparatus according to claim 1; wherein the lapping member is generally disk-shaped and has an outer diameter smaller than an inner diameter of the tubular member.

3. An end face polishing apparatus according to claim 1; wherein the tubular member has a plurality of pin portions extending from the first surface thereof; and wherein the support member has a plurality of recessed portions formed in the main surface and each receiving a respective one of the pin portions of the tubular member.

4. An end face polishing apparatus according to claim 3; wherein the tubular member has a plurality of magnetic members disposed in the first surface thereof and magnetically connected to the main surface of the support member.

5. An end face polishing apparatus comprising:
   a support member having a main surface and mounted for undergoing rotational movement;
   a tubular member mounted on the support member for rotation therewith, the tubular member having a first surface connected to the main surface of the support member and a second surface extending in an axial direction at a first distance from the main surface of the support member;
   a lapping member mounted on the support member for rotation therewith, the lapping member having a first surface connected to the main surface of the support member and a second surface extending in the axial direction at a second distance from the main surface of the support member smaller than the first distance; and
   a polishing fixture having a guide member for sliding contact with the second surface of the tubular member.

6. An end face polishing apparatus according to claim 5; wherein the lapping member is generally disk-shaped and has an outer diameter smaller than an inner diameter of the tubular member.

7. An end face polishing apparatus according to claim 5; wherein the tubular member has a plurality of pin portions extending from the first surface thereof; and wherein the support member has a plurality of recessed portions formed in the main surface and each receiving a respective one of the pin portions of the tubular member.

8. An end face polishing apparatus according to claim 7; wherein the tubular member has a plurality of magnetic members disposed in the first surface thereof and magnetically connected to the main surface of the support member.

9. An end face polishing apparatus according to claim 5; wherein the polishing fixture has a support portion for supporting a workpiece having an end face for contacting the lapping member to polish the end face of the workpiece during rotation of the lapping member.

10. An end face polishing apparatus according to claim 9; wherein the guide member of the polishing fixture slidably contacts the second surface of the tubular member to limit the amount of polishing of the end face of the workpiece.

11. An end face polishing apparatus comprising:
    a support member having a main surface and mounted for undergoing rotational movement;
    a tubular member mounted on the support member for rotation therewith, the tubular member having a first surface connected to the main surface of the support member and a second surface extending in an axial direction at a first distance from the main surface of the support member;
    a lapping member mounted on the support member for rotation therewith, the lapping member having a first surface connected to the main surface of the support member and a second surface extending in the axial direction at a second distance from the main surface of the support member smaller than the first distance;
    a polishing fixture for supporting a plurality of workpieces each having an end face for contacting the lapping member to polish the end faces of the workpieces during rotation of the lapping member; and
    at least one guide member for sliding contact with the second surface of the tubular member to limit the amount of polishing of the end faces of the workpieces.

12. An end face polishing apparatus according to claim 11; wherein the lapping member is generally disk-shaped and has an outer diameter smaller than an inner diameter of the tubular member.

13. An end face polishing apparatus according to claim 11; wherein the tubular member has a plurality of pin portions extending from the first surface thereof; and wherein the support member has a plurality of recessed portions formed in the main surface and each receiving a respective one of the pin portions of the tubular member.

14. An end face polishing apparatus according to claim 13; wherein the tubular member has a plurality of magnetic members disposed in the first surface thereof and magnetically connected to the main surface of the support member.

15. An end face polishing method, comprising the steps of:
    providing a rotatable support member having a main surface;
    mounting a tubular member on the support member for rotation therewith by connecting a first surface of the tubular member to the main surface of the support member so that a second surface of the tubular member extends in an axial direction at a first distance from the main surface of the support member; and
    mounting a polishing member on the support member for rotation therewith by connecting a first surface of the polishing member to the main surface of the support member so that a second surface of the polishing member extends in the axial direction at a second distance from the main surface of the support member smaller than the first distance.

16. An end face polishing method according to claim 15; further comprising the steps of providing a polishing fixture supporting a workpiece having an end face; and moving the polishing fixture to bring the end face of the workpiece into pressure contact with the polishing member to thereby polish the end face of the workpiece during rotation of the support member.

17. An end face polishing method according to claim 15; wherein the polishing fixture has a guide member; and further comprising the step of bringing the second surface of the tubular member into sliding contact with the guide member to limit the amount of polishing of the end face of the workpiece.

18. An end face polishing apparatus comprising:

a rotational shaft mounted for undergoing rotation about a first axis and for undergoing revolving movement about a second axis offset from the first axis, the rotational shaft having a first end for connection to a support member to rotate and revolve the support member about the first and second axes, respectively;

a tubular member mounted on the support member for rotation therewith, the tubular member having a first surface connected to a main surface of the support member and a second surface extending in an axial direction at a first distance from the main surface of the support member;

a polishing member mounted on the support member for rotation therewith and having a polishing surface extending in the axial direction at a second distance from the main surface of the support member smaller than the first distance;

a jig board for supporting at least one workpiece having an end face and having at least one guide member; and a movable support mechanism for supporting the jig board and for moving the jig board to bring the end face of the workpiece into pressure contact with the polishing surface of the polishing member to thereby polish the end face of the workpiece during rotation and revolving movement of the first rotational shaft and to bring the guide member into sliding contact with the guide member to limit the amount of polishing of the end surface of the workpiece.

19. An end face polishing apparatus according to claim 18; wherein the polishing member is generally disk-shaped and has an outer diameter smaller than an inner diameter of the tubular member.

20. An end face polishing apparatus according to claim 18; wherein the tubular member has a plurality of pin portions extending from the first surface thereof; and wherein the support member has a plurality of recessed portions formed in the main surface and each receiving a respective one of the pin portions of the tubular member.

21. An end face polishing apparatus according to claim 20; wherein the tubular member has a plurality of magnetic members disposed in the first surface thereof and magnetically connected to the main surface of the support member.

* * * * *